(12) United States Patent
Figurel

(10) Patent No.: US 6,478,283 B1
(45) Date of Patent: Nov. 12, 2002

(54) WHEELCHAIR BRAKE EXTENSION HOLDER

(76) Inventor: Kathleen J. Figurel, 3446 Syracuse St., Dearborn, MI (US) 48124-3390

(*) Notice: Subject to any disclaimer, the term of this patent is extended or adjusted under 35 U.S.C. 154(b) by 34 days.

(21) Appl. No.: 09/688,759

(22) Filed: Oct. 16, 2000

(51) Int. Cl.$^7$ .............................. B60T 7/08; A61G 5/02
(52) U.S. Cl. .................. 248/534; 248/221.11; 248/301; 248/304; 280/304.1; 280/250.1
(58) Field of Search ........................... 248/534, 221.11, 248/314, 301, 304, 229.1, 540, 541, 224.7, 225.21; 280/304.1, 250.1; 188/246, 2 F, 60, 31, 69; 403/391, 396, 389; 292/101, 103

(56) References Cited

U.S. PATENT DOCUMENTS

| | | | | |
|---|---|---|---|---|
| 3,792,804 A | * | 2/1974 | Ponzo | 211/113 |
| 4,560,033 A | * | 12/1985 | DeWoody | 188/2 F |
| 4,796,848 A | * | 1/1989 | Lanz | 174/159 |
| 5,005,790 A | * | 4/1991 | Harris, III | 248/75 |
| 5,303,945 A | * | 4/1994 | Oxford | 280/304.1 |
| 5,501,688 A | * | 3/1996 | Whiteside et al. | 140/119 |
| 5,529,427 A | * | 6/1996 | Bost | 403/391 |
| 5,582,334 A | * | 12/1996 | Blazer et al. | 223/85 |
| 6,036,153 A | * | 3/2000 | Rose et al. | 24/598.3 |
| 6,292,984 B1 | * | 9/2001 | Nelson | 24/134 R |

* cited by examiner

Primary Examiner—Korie Chan
Assistant Examiner—Ingrid Weinhold

(57) ABSTRACT

The present invention is an apparatus for securing a wheelchair brake handle extension to a wheelchair when the brake bandle extension is not in use. The invention has an aperture that allows the invention to be placed onto an existing brake handle. The invention fits securely onto the brake handle and allows a portion of the brake handle to extend beyond the top portion of the invention. A brake handle extension can then be placed onto the exposed portion of the brake handle and the brake can be actuated via the brake handle extension When the brake handle extension is not in use, the brake handle extension can be stored in the hook of the invention by frictional engagement with the inside of the hook.

6 Claims, 1 Drawing Sheet

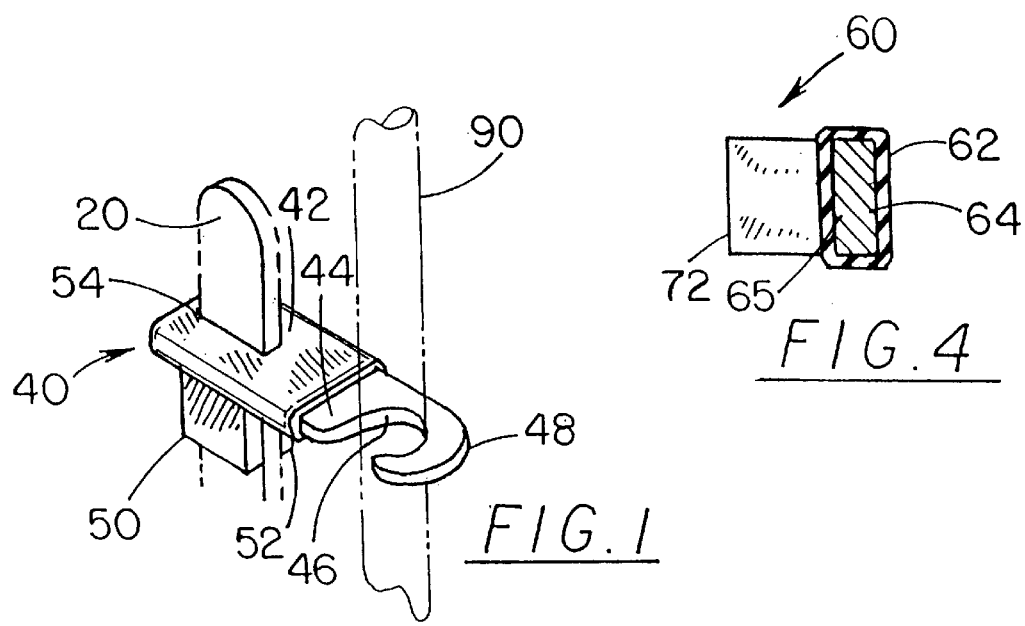

WHEELCHAIR BRAKE EXTENSION HOLDER

BACKGROUND OF THE INVENTION

1. Field of the Invention

The present invention relates to an apparatus for securing a wheelchair brake extension to a wheelchair when the brake extension is not in use.

2. Description of the Prior Art

Wheelchairs have handbrakes so that the wheelchair can be prevented from moving. The occupant often uses a wheelchair brake handle extension so that he or she does not have to lean over as far as is required to reach the brake handle without the extension. When the wheelchair brake has been engaged or disengaged using the brake handle extension, the occupant must do something with the extension. If the extension is set down it may be difficult to retrieve. The prior art discloses a variety of devices for affixing devices to a wheelchair. For example, U.S. Pat. No. 5,154,331 discloses a device for storing personal items on a wheelchair. However, the prior art does not disclose an apparatus which stores the brake handle extension in close proximity to the brake handle.

What is needed beyond the prior art is wheelchair brake extension holder that will allow the occupant of the wheelchair to store the brake handle extension when not in use by keeping the extension affixed to the wheelchair in close proximity to the brake.

SUMMARY OF THE INVENTION

The present invention meets the needs and solves the problems identified above by providing an apparatus removably engaged to the hand brake of a wheelchair. The invention has an open aperture for sliding engagement of the wheelchair hand brake extension that is capable of storing the brake extension when the brake extension is not in use.

The foregoing and other objects, features and advantages of the invention will be apparent from the following more particular description of a. preferred embodiment of the invention, as illustrated in the accompanying drawings wherein like reference numbers represent like parts of the invention.

BRIEF DESCRIPTION OF THE DRAWINGS

FIG. 1 is right side perspective view of the invention;

FIG. 2 is a bottom perspective view of another embodiment of the invention;

FIG. 3 is a right side view of a wheelchair with the wheelchair brake extension affixed to the wheelchair brake extension holder; and FIG. 4 is a cross sectional view along line 4—4 of FIG. 2.

DESCRIPTION OF PREFERRED EMBODIMENTS

FIG. 1 shows brake extension holder 40 removably engaged to brake handle 20. Brake extension holder 40 has hook arm 44, cover 42, first support 50, and second support 52. Cover 42 may be rubber or plastic and is molded over hook arm 44 for frictional engagement with hook arm 44. In brake handle extension 40, the long axis of first support 50 and second support 52 are parallel with the long axis of hook arm 44. Hook arm 44 has aperture 54 for receiving brake handle 20. First support 50 and second support 52 are fixedly engaged to the bottom of hook arm 44. Cover 42 has a first rectangular aperture for receiving brake handle 20 and a second rectangular aperture (not shown) for receiving brake handle 20, first support 50, and second support 52. Hook arm 44 extends outward from cover 42 to form hook 48. Hook 48 has inner edge 46 for sliding engagement of brake handle extension 90. As seen in FIG. 1, the inside diameter of hook 48 is approximately the same as the outer diameter of brake handle extension 90 so that the outer surface of brake handle extension 90 will frictionally engage inner edge 46 of hook 48 when brake handle extension 90 is not in use. In the preferred embodiment, brake extension holder 40 is approximately three and one-half inches long, with hook 48 having a diameter of one-half inch. Hook arm 44 and hook 48 are made of one piece of metal which may be bent to adjust hook 48 to fit various diameters of brake handle extensions 90.

FIG. 2 is a bottom view of another embodiment of brake extension holder 40. Second brake extension holder 60 has hook arm 64 in which the plane of hook 68 is twisted at a 90-degree angle relative to the plane of hook arm 64. Cover 62 is molded to hook arm 64. First support 70 and second support 72 are affixed to hook arm 64 so that first support 70 and second support 72 are perpendicular to hook arm 64. The long axis of aperture 74 is perpendicular to the long axis of hook arm 64. Second brake extension holder 60 will project away from brake handle 20 and is perpendicular to the long axis of brake handle 20. Second brake extension holder 60 is for use with wheelchairs in which the locked position of brake handle 20 is parallel to the floor. The 90-degree twist in hook 68 is necessary so that brake handle extension 90 will be perpendicular to the floor when placed into hook 68. Persons skilled in the art will realize that the degree of twist in hook 68 may be varied depending on the angle of the locked position of brake handle 20.

FIG. 3 is a right side view of wheelchair 10 having rear wheel 12, rear wheel hub 26, brake arm 24, brake handle connector 22, brake handle 20, seat 16, front wheel 14 and armrest 18. Brake handle extension 90 is shown in position 92 in dotted lines. In position 92, brake handle extension 90 engages brake handle 20, so that brake handle 20 may be actuated via brake handle extension 90. In position 92, brake handle extension 90 extends above armrest 18 to make the actuation of brake handle 20 easier for the wheelchair occupant. In FIG. 3, third brake extension holder 80 is shown. Third brake extension holder 80 is the same as second brake extension holder 60 with the exception that hook 68 is not twisted and lies in the same plane as hook arm 64. When brake handle extension 90 is removed from brake handle 20 and placed into third brake extension holder 80, brake handle extension 90 will be affixed to wheelchair 10 and will not extend above armrest 18.

FIG. 4 is a cross sectional view of second brake extension holder 60 along line 4—4 of FIG. 2. Second support 72 is shown affixed to bottom 65 of hook arm 64. Cover 62 is shown molded around hook arm 64.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A wheelchair comprising:

a chair;

a plurality of wheels attached to said chair;

at least one brake attached to said chair, wherein said brake has a brake arm and said brake is capable of frictionally engaging at least one of said wheels;

a brake arm extension comprising:
   a hook arm having a hook and an aperture;
   a first support and a second support fixedly engaged to said hook arm;
   wherein said first support has a first support plane and said second support has a second support plane; and
   wherein said first support plane is parallel to and independent of said second support plane.

2. The wheelchair of claim 1 wherein the brake arm extension further comprises a cover having a first cover aperture and a second cover aperture wherein said cover is frictionally engaged to said hook arm.

3. The wheelchair of claim 1 wherein the brake arm extension further comprises:

said hook arm having a hook arm long axis;

said first support having a first support long axis; and said second support having a second support long axis;

wherein said first support long axis and said second support long axis are parallel to said hook arm long axis.

4. The wheelchair of claim 1 wherein the brake arm extension further comprises:

said hook arm having a hook arm long axis;

said first support having a first support long axis; and said second support having a second support long axis;

wherein said first support long axis and said second support long axis are perpendicular to said hook arm long axis.

5. The wheelchair of claim 1 wherein the brake arm extension further comprises:

said hook arm having a hook arm plane;

said hook having a hook plane; and wherein said hook arm plane is coplanar with said hook plane.

6. The wheelchair of claim 1 wherein the brake arm extension further comprises:

said hook arm having a hook arm plane; and said hook having a hook plane;

wherein said hook arm plane is perpendicular to said hook plane.

* * * * *